A. COOK.
SHIELD FOR ROLL BEARINGS.
APPLICATION FILED FEB. 13, 1919.
1,315,094.
Patented Sept. 2, 1919.
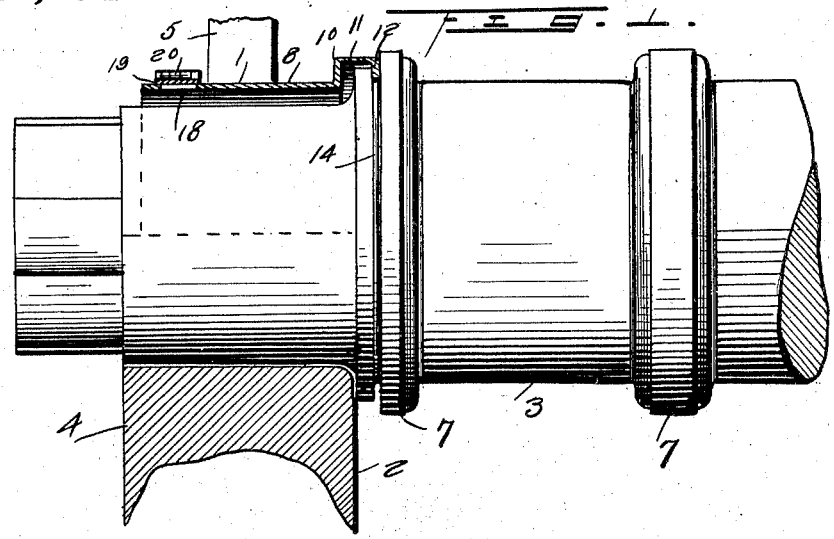
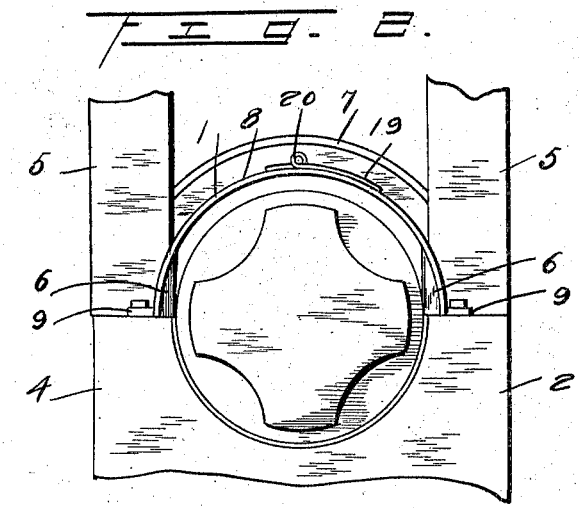
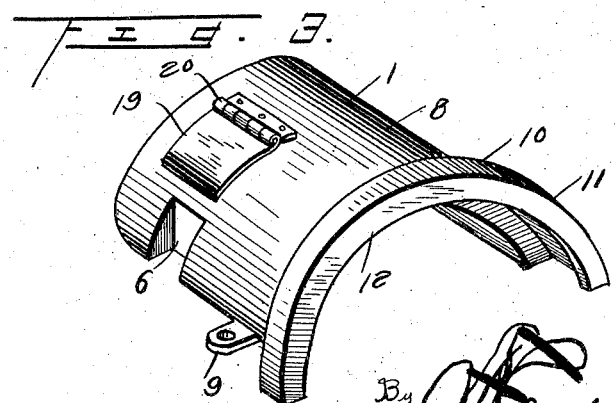
Inventor
A. Cook.
By A. Randulph Jr., Attorney

UNITED STATES PATENT OFFICE.

AUGUST COOK, OF COLUMBUS, OHIO.

SHIELD FOR ROLL-BEARINGS.

1,315,094. Specification of Letters Patent. Patented Sept. 2, 1919.

Application filed February 13, 1919. Serial No. 276,837.

*To all whom it may concern:*

Be it known that I, AUGUST COOK, a citizen of the United States, residing at Columbus, in the county of Franklin and State of Ohio, have invented certain new and useful Improvements in Shields for Roll-Bearings; and I do hereby declare the following to be a full, clear, and exact description of the invention, such as will enable others skilled in the art to which it appertains to make and use the same.

This invention relates to shields for bearings and the primary object of the invention is to provide an improved shield for bearing for rolls, so as to prevent cinders and scale from coming in contact with the bearing of the rolls and to also eliminate the hot particles from the ingots passing through the rolls from dropping on the grease in the bearings and thus setting fire to the same.

Another object of the invention is to provide an improved guard for the bearings for rolls and the like, which is so constructed, that the accidental displacement thereof is absolutely prevented, the guard forming a connection with the rolls so as to prevent particles from passing between the guard and rolls.

A further object of the invention is to provide an improved guard for bearings for rolls and the like, which is so constructed that the lubricant can be placed in the bearings, without necessitating the removal of the guards therefrom.

A still further object of the invention is to provide an improved guard of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof in which:

Figure 1 is a longitudinal section through the improved guard, showing the same applied to a roll, Fig. 2 is an end elevation of the guard showing the same applied to a roll, and Fig. 3 is a detail perspective view of the guard removed from the roll.

Referring to the drawings in detail wherein similar reference characters designate corresponding parts throughout the several views, the numeral 1 generally indicates the improved guard, which is adapted to be secured to a bearing 2 of a roll 3. As shown in Figs. 1 and 2, only the lower roll has been shown, the upper roll being broken away for clearness. The bearing 2 includes a bearing block 4 and upwardly extending supporting side bars 5. The roll 3 has the terminals 6 thereof reduced and fitted in the bearing blocks 4. The roll 3 is of the ordinary or any preferred construction and includes the ordinary upstanding annular flanges 7 between which the metal is adapted to be rolled or drawn.

The improved guard 1 includes a substantially semi-cylindrical body 8, preferably constructed from thin boiler plate or the like and has the lower edges thereof resting upon the upper surface of the bearing blocks 4 and the inner portions of the lower edges are provided with outstanding apertured ears 9 which are adapted to receive screws or other fastening elements, so that the same can be rigidly secured to the bearing blocks. The forward inner edge of the semi-cylindrical body 8 is provided with a vertical upstanding flange 10, which is gradually widened toward the upper end thereof. The upstanding flange 10 is curved outwardly at right angles to provide a guard flange 11, which has its outer edge bent downwardly at right angles in spaced parallel relation to the upstanding flange 10 as at 12 and adapted to be positioned in a groove 14 formed in the roll 3 adjacent to the outer portion of the annular flange 7, so as to form a positive means for preventing displacement of the guard in relation to the roll and preventing particles from seeping between the guard and the roll. The semi-cylindrical body 8 is preferably spaced from the roll, as shown, and is provided intermediate its ends with struck in portions 16 which are adapted to receive the side bars 5. This also forms additional means for preventing accidental movement of the guard. The semi-cylindrical body 8 is provided with a cut out portion 18 which is adapted to be covered by an arcuate plate 19, which is hingedly connected as at 20 to one wall of the cut out portion. This provides means, whereby lubricant may be readily inserted in the bearing without necessitating the removal of the guard.

From the foregoing description it can be seen that an improved guard is provided for bearings for rolls in which the displacement of the same is absolutely prevented, and which will effectively prevent cinders, and scale coming in contact with the bearings of the rolls and also prevents the hot cinders from the ingots passing through the rolls and coming in contact with the grease in the bearings.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

1. In a device of the class described, the combination with a roll and bearing therefor, upstanding side bars carried by the bearing, of a guard arranged to encompass the bearing, and struck in portions formed in the guard arranged to receive the side bars.

2. A guard for bearings for rolls and the like comprising a semi-cylindrical body, an upwardly extending flange formed on the inner edge of the body, said flange having the outer edge thereof bent outwardly at right angles, and a downwardly extending flange formed on the bent portion and positioned in parallel relation to the upwardly extending flange, outwardly projecting ears formed on the lower edge of the body, and a hinged cover carried by said body, as and for the purpose specified.

In testimony whereof I affix my signature in presence of two witnesses.

AUGUST COOK.

Witnesses:
  GEORGE M. STEPHANS,
  MELINO JOHN COOK.

Copies of this patent may be obtained for five cents each, by addressing the "Commissioner of Patents, Washington, D. C."